US011001187B1

(12) United States Patent
Kelly et al.

(10) Patent No.: US 11,001,187 B1
(45) Date of Patent: May 11, 2021

(54) MOBILE DETENTION AND DETAINMENT CENTER

(71) Applicant: World Wide Mobile Detention Center, LLC, Seymour, MO (US)

(72) Inventors: Stephen D. Kelly, Arcadia, KS (US); Anthony C. Kelly, Macomb, MO (US)

( * ) Notice: Subject to any disclaimer, the term of this patent is extended or adjusted under 35 U.S.C. 154(b) by 260 days.

(21) Appl. No.: 16/123,126

(22) Filed: Sep. 6, 2018

Related U.S. Application Data

(60) Provisional application No. 62/556,025, filed on Sep. 8, 2017, provisional application No. 62/691,335, filed on Jun. 28, 2018.

(51) Int. Cl.
*B60P 3/32* (2006.01)
*E04H 1/12* (2006.01)
*E04H 1/00* (2006.01)

(52) U.S. Cl.
CPC ............... *B60P 3/32* (2013.01); *E04H 1/005* (2013.01); *E04H 2001/1283* (2013.01)

(58) Field of Classification Search
CPC ... B60P 3/32; B60P 3/34; E04H 1/005; E04H 3/08
USPC ...................... 296/24.42, 24.33, 24.38, 24.39
See application file for complete search history.

(56) References Cited

U.S. PATENT DOCUMENTS

| D182,288 | S | 3/1958 | Koller |
| D222,342 | S | 10/1971 | Glisson |
| D222,346 | S | 10/1971 | Schmelzer |
| D226,074 | S | 1/1973 | Glisson |
| 3,774,956 | A * | 11/1973 | Barlow ..................... B60P 3/34 296/156 |
| D231,608 | S | 5/1974 | Barlow |
| D250,256 | S | 11/1978 | Battles, Sr. |
| D268,921 | S | 5/1983 | Marshall |
| D274,844 | S | 7/1984 | Corey |
| D295,734 | S | 5/1988 | Barber et al. |
| D314,164 | S | 1/1991 | Barber et al. |
| 5,353,557 | A * | 10/1994 | Lerner ...................... E04H 3/08 52/106 |
| 6,179,358 | B1 * | 1/2001 | Hirayama ................. B60P 3/14 296/24.38 |

(Continued)

FOREIGN PATENT DOCUMENTS

WO WO-2015143566 A1 * 10/2015 ............. E04H 1/005

OTHER PUBLICATIONS

Beautiful! St. Charles Shipping Container Home, YouTube, Sep. 26, 2017. Available at: https://www.youtube.com/watch?v=_znEsRU_-c4.

*Primary Examiner* — Jason S Morrow
(74) *Attorney, Agent, or Firm* — Spencer Fane LLP

(57) ABSTRACT

Semi-trailer units are configured to erect a mobile and scalable detention center to help relieve overcrowded conditions in prisons. A series of conventional semi-trailer units are modified and configured to create a detention center providing typical incarceration features. The trailer units can be arranged in different configurations to provide space for different purposes. Multiple trailer units can be positioned side by side along their length with the walls of the interior trailer units removed to increase the usable area within and among the joined trailer units. The detention center can be scaled up in overall size with additional units as necessary, and reduced in scale or deconstructed if the overcrowding situation were to become relieved.

16 Claims, 9 Drawing Sheets

(56) References Cited

U.S. PATENT DOCUMENTS

| | | |
|---|---|---|
| D523,378 S | 6/2006 | Tait |
| D543,902 S * | 6/2007 | Kelly |
| 2007/0102946 A1 * | 5/2007 | Blackwell ................ B60P 3/14 296/24.38 |
| 2007/0132262 A1 * | 6/2007 | Chui Peng Sun ..... A61G 3/001 296/24.38 |
| 2015/0101264 A1 * | 4/2015 | Jornitz ................ E04B 1/34384 52/79.9 |
| 2017/0328054 A1 * | 11/2017 | Bakken .................... E04H 9/14 |
| 2019/0277016 A1 * | 9/2019 | Ahern ................... E04B 1/1912 |

\* cited by examiner

MOBILE DETENTION AND DETAINMENT CENTER

RELATED APPLICATIONS

The present patent application is related to and claims priority benefit to earlier-filed provisional patent application titled MOBILE DETENTION AND DETAINMENT CENTER, Ser. No. 62/556,025, filed Sep. 8, 2017; and provisional patent application titled MOBILE DETENTION AND DETAINMENT CENTER, Ser. No. 62/691,335, filed Jun. 28, 2018. The identified earlier-filed applications are hereby incorporated by reference into the present application as though fully set forth herein.

FIELD OF THE INVENTION

The presently disclosed subject matter relates to the design and construction of temporary housing and related facilities. In particular, the subject matter relates to providing temporary housing to relieve overcrowded conditions in jails and prisons.

BACKGROUND OF THE INVENTION

It is an unfortunate societal consequence that there must exist prisons. It is an even greater dilemma when there are more prisoners than can be adequately housed and detained in existing facilities. Overcrowded jails and prisons leads to numerous problems, such as stress on the inmate populace, burdensome working conditions for guards, and extra operating costs for the jail institution. Solutions for overcrowding are not simple to achieve and their implementation can create other problems. For example, relieving overcrowded conditions through the early release of prisoners can return dangerous persons back into the civilian population before rehabilitation is complete. Transporting prisoners from one overcrowded facility to another less crowded facility is costly and risky.

Relieving overcrowded prison conditions should not have to be the driving force in determining justice and incarceration policy and strategy. A solution that would minimize overcrowded prison conditions would free up resources such that more socially appropriate rehabilitation strategies could be considered. Simply shuffling prisoners from an overcrowded prison facility to a different facility offers an unsatisfactory solution. It is an expensive proposition to transport prisoners in terms of manpower and logistics required to make the transfer and can pose an unexpected and unwanted burden on the destination facility. If overcrowding became less of a factor, then decisions addressing incarceration policy and strategy could focus on more meaningful issues such as justice and societal influences.

SUMMARY OF THE INVENTION

The present invention provides a solution to relieve overcrowded conditions at a particular jail or prison facility. In particular, the invention comprises a system for joining together a series of conventional semi-trailer units that can be modified and configured to create a detention center providing typical incarceration features such as sleeping quarters, dining facilities, hygiene and toilet facilities, inmate common areas, segregation cells and exercise areas to name a few. Each trailer unit can be reinforced for required security and be adapted for joining together with other trailer units to create a mobile and scalable incarceration facility.

The trailer units can be arranged in different configurations to provide space for different purposes. For example, multiple trailer units can be positioned side by side along their length with the walls of the interior trailer units removed to increase the usable area within and among the joined trailer units. Trailer units can also be joined end-to-end to increase the length of the overall facility. For instance, to create a quadrangle type enclosure among the joined units, trailers units can also be joined perpendicularly to each other. Reinforcing plates are placed at the areas where the trailer walls are removed to provide structural integrity and by which to support columns for supporting the ceilings of the trailer units.

The trailer units can be further modified to provide space in the overhead area for supplying HVAC, running utility lines to service various electrical, plumbing and communication needs. Where necessary, additional walls in the interior of the trailer units can be made to create detention pods, utility rooms, command centers and other functional areas.

The present invention therefore provides a solution in relieving overcrowded jail conditions and/or in providing temporary incarceration facilities. The ready availability of trailer units and their uniform size enables a prison administration to plan and design an appropriate footprint to utilize any available area on which to erect the mobile detention center. The detention center can be scaled up in overall size with additional units as necessary, and reduced in scale or deconstructed if the overcrowding situation were to become relieved. Accordingly, the present invention offers mobility and scalability in addressing overcrowded conditions in existing incarceration facilities and in creating temporary incarceration facilities where none previously existed.

These and other features of the present invention are described in greater detail below in the section titled DETAILED DESCRIPTION OF THE INVENTION.

BRIEF DESCRIPTION OF THE DRAWING FIGS

The present invention is described herein with reference to the following drawing figures, with greater emphasis being placed on clarity rather than scale:

DETAILED DESCRIPTION OF THE INVENTION

In providing a base unit from which the temporary incarceration facility can be constructed as contemplated by the present invention, a standard over-the-road cargo semi-trailer unit (such as those provided under the trademark GREAT DANE) is used. These trailer units are generally uniform in size and have a standard dimension of 53 feet in length and 8.5 feet in width and a ceiling height of 9 feet. Because of their relative resistance to leakage, the original deck, walls and roof structure of the trailer unit are preserved as much as possible in the configuration of the modular unit used for constructing the detention center. The rear door of the trailer unit is removed and replaced with a wall when needed. Any openings to the trailer unit, such as doors and windows are constructed to provide extra reinforcement for security purposes.

While it is possible that only a single trailer unit might be necessary as a detention space in certain instances, the invention specifically contemplates that multiple trailer units will need to be connected to provide the space needed for a fully functional detention center. Accordingly, the walls of the trailer units will need to be removed at various points. The walls can be removed by using such tools as are generally known to those skilled in the art and may include reciprocating saws, metal grinders and torches.

Figure 1:
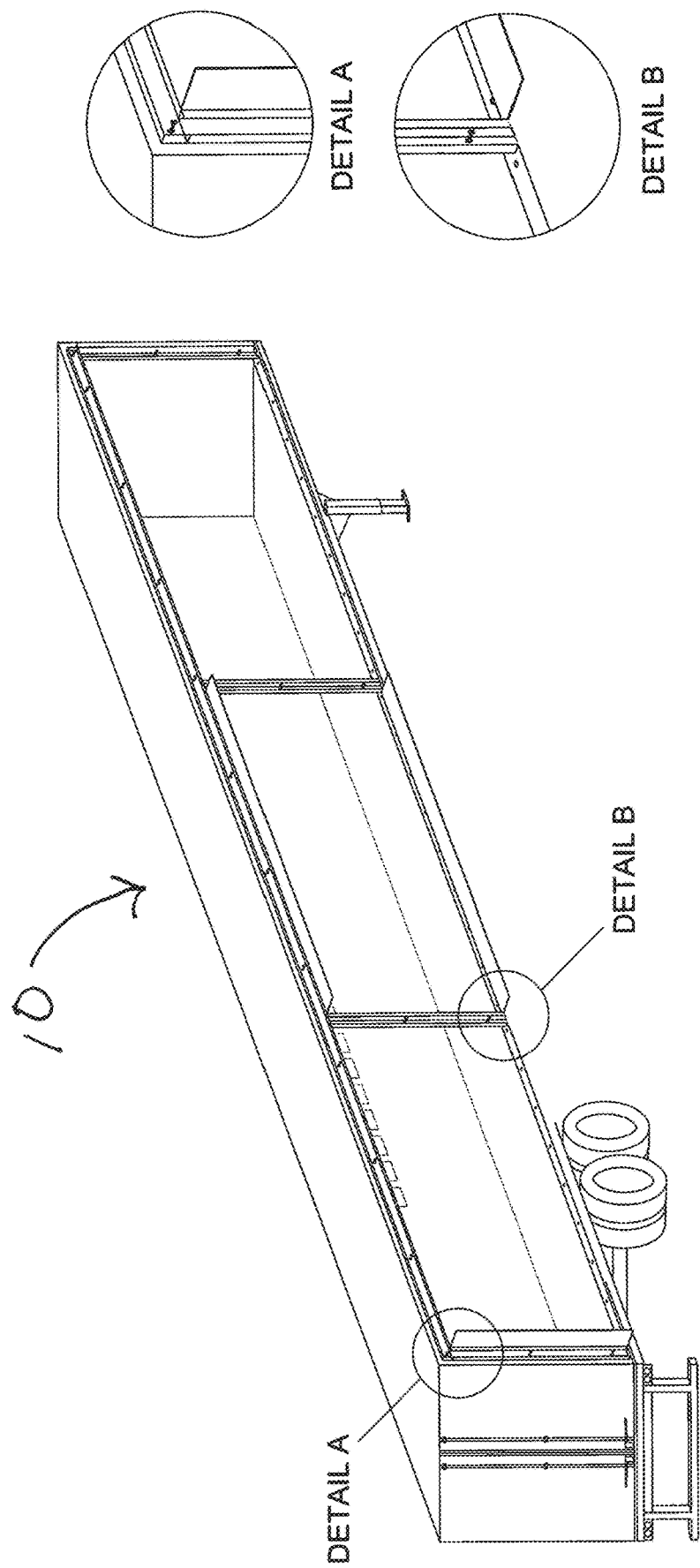
FIG. 1 is a perspective view of the side of a semi-trailer unit that has been modified according to the invention.

In preparing a trailer unit configuration that will comprise a large open area, such as a common area, a series of trailer units are moved into parallel alignment such that their side walls are adjacent to each other. Because of their wheels and mobility, the trailer units can be simply moved around and re-positioned as required. FIG. 1 shows a trailer unit 10 being configured and prepared for joining to an adjacent trailer unit. The first trailer unit 10 will constitute the outer perimeter of the constructed space, so the side wall of the trailer unit facing inside to the space is prepared for removal. Steel plating is placed on the exterior of trailer units. A stainless steel foundation plate is prepared (see FIG. 1 Detail B) for securing to the trailer deck at the long edge where the wall is to be removed. The foundation plate is secured to the original trailer deck floor using a series of through-bolts. Next, 6"×2" stainless steel tubing uprights are welded to this deck plate (see FIG. 1 Detail A). With respect to the first trailer unit 10 that will form the perimeter of the construction as shown in FIG. 1, the stainless steel tubing uprights are fastened through the original trailer wall to matching exterior stainless steel plates (this makes a "sandwich" comprised of an exterior stainless steel plate, original trailer wall and 6"×2" stainless steel tubing). These uprights are placed at intervals along the length of the trailer at distances commensurate with the desired application/opening sizes. Atop these uprights, additional 6"×2" stainless steel tubing headers are welded in place. Once this simple framework is installed, the openings are cut out of the original trailer wall at a dimension described by the stainless steel frame work previously installed. At this point, stainless steel "C" channel is used to cap the cut edges of each opening while encapsulating the uprights for a clean finish and finally welded in place (see FIG. 2). Once these openings are fashioned for each trailer (such as trailers 20 and 30 shown in FIG. 3) they are moved into alignment with each other to form an open area within the overall structure. 14" connector plates are welded in place to connect the trailers around the entire perimeter of each opening (see FIG. 2). The result is an 8" gap between each trailer and a fully sealed opening (see Details A and B in FIG. 2).

Figure 2:
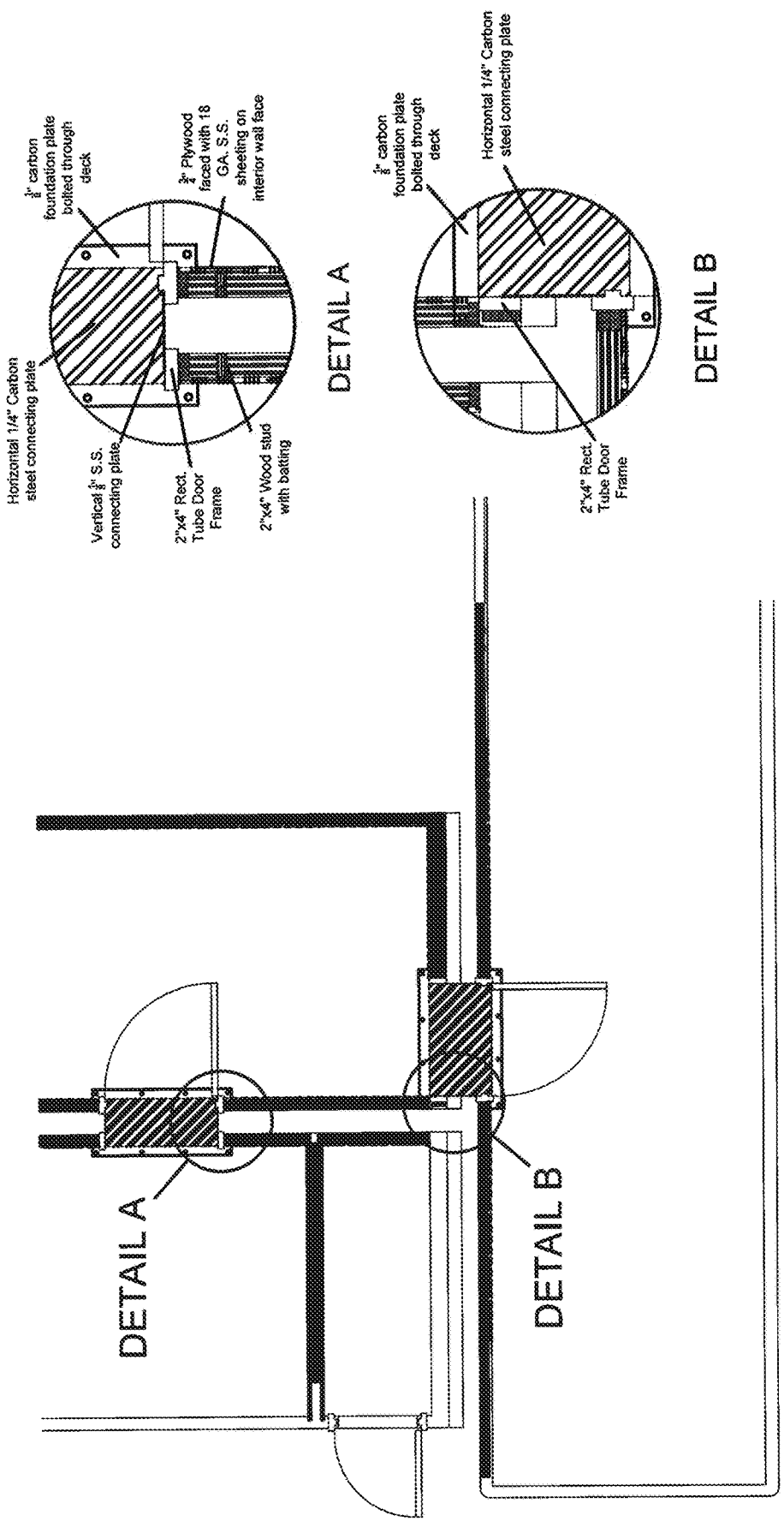
FIG. 2 is a top plan, partial sectional view of semi-trailer units joined together according to the invention.

The same procedure is used as described above for making a connection where the trailers are joined perpendicularly, such as shown in FIG. 2 Detail B. In that situation, the rear of one trailer unit is used when joining perpendicularly to another trailer unit. The original rear trailer doors are removed and a stainless steel header is fabricated and installed at the rear of the trailer, above, forming an opening equal in dimension to that cut in the side of the other trailer to which it is joined. 14" stainless steel connecting plates are used to connect both trailers around the entire perimeter of the openings using the installed framework in the side of the first trailer and the original trailer rear framework and header at the rear of the other trailer.

When the entire length of wall of the trailer is required to be opened up, such as when an open area is desired between two adjacent trailer units placed side-by-side, it is necessary to leave support columns (preferably two), evenly spaced over the entire length, along the adjoining sides of the trailer units. This maintains structural integrity. However, additional lateral support is provided by using a stainless steel tubing grid comprised of 1"×1" stainless steel cross-members, spaced 30" apart, in the over head area which also support the stainless steel interior ceiling panels. Racking strength is also provided by using closed-cell foam insulation applied to the interior/underside of the original trailer roof.

The interior walls of the trailer units are covered with stainless steel sheeting which are applied using adhesive/sealant compounds. Further reinforcement is provided in certain walls to meet construction requirements. Such reinforcement is accomplished using a lattice-work of steel tubing in various dimensions as required and commensurate with the desired wall dimensions. Insulation is installed between the trailer wall and the stainless steel sheeting.

Doors and windows are cut in to the walls where necessary and reinforced using stainless steel tube framework. The windows are made of polycarbonate material of an appropriate thickness such as Lexan™ 9034.

Interior enclosures may be constructed within the trailers. First, any required structural steel framework for any doors as well as any required door frames to accommodate security concerns is installed. Next, the walls are built out to appropriate thickness (to accommodate wall insulation i.e. 4" thick) using wall studs placed 16" on center as well as angle iron supports for future mounting of the ceiling grid framework. Next, ¾" marine grade plywood is installed on the interior side of the stud wall framing Next, the ceiling grid framework is installed consisting of stainless steel 1"×1" rectangular tubing cross members placed 30" on center and welded to the previously installed angle iron. Next, if required, interior walls are built that run the width of the trailer using normal stud-wall techniques. Finally, stainless steel sheeting is applied to the inside of the enclosure on the ceiling and walls. The floors are finished using a USDA grade polyurethane textured coating.

A temporary detention center erected under the invention can be adapted for placement in a wide variety of spaces. If an existing jail facility has adjacent space, such as a pavement surface (see FIG. 9), the temporary detention center can be erected on that site. Of course, the temporary detention center can be erected on an open field, independently of any existing structure. Grading of the site, if necessary due to uneven or sloped ground, can be done beforehand. Generally, the trailer units are anchored to the ground using a combination of concrete blocks and ground anchors. Approximately eight ton of concrete blocks are used per trailer unit. Ground anchors are standard industry anchors such as the auger type. The units are leveled using a combination of jacks, blocks and standard leveling instruments.

Skirting is installed along the lower portion of the trailer units to hide that portion of the units as well as prevent inmates from crawling underneath. This skirting is not a part of/extension of the wall structures. It can be of any material that is cost effective yet still satisfies the requirements of the application. For instance, if it is skirting that fronts an inmate recreation yard it must be stainless steel or an equivalent material.

Figure 8:
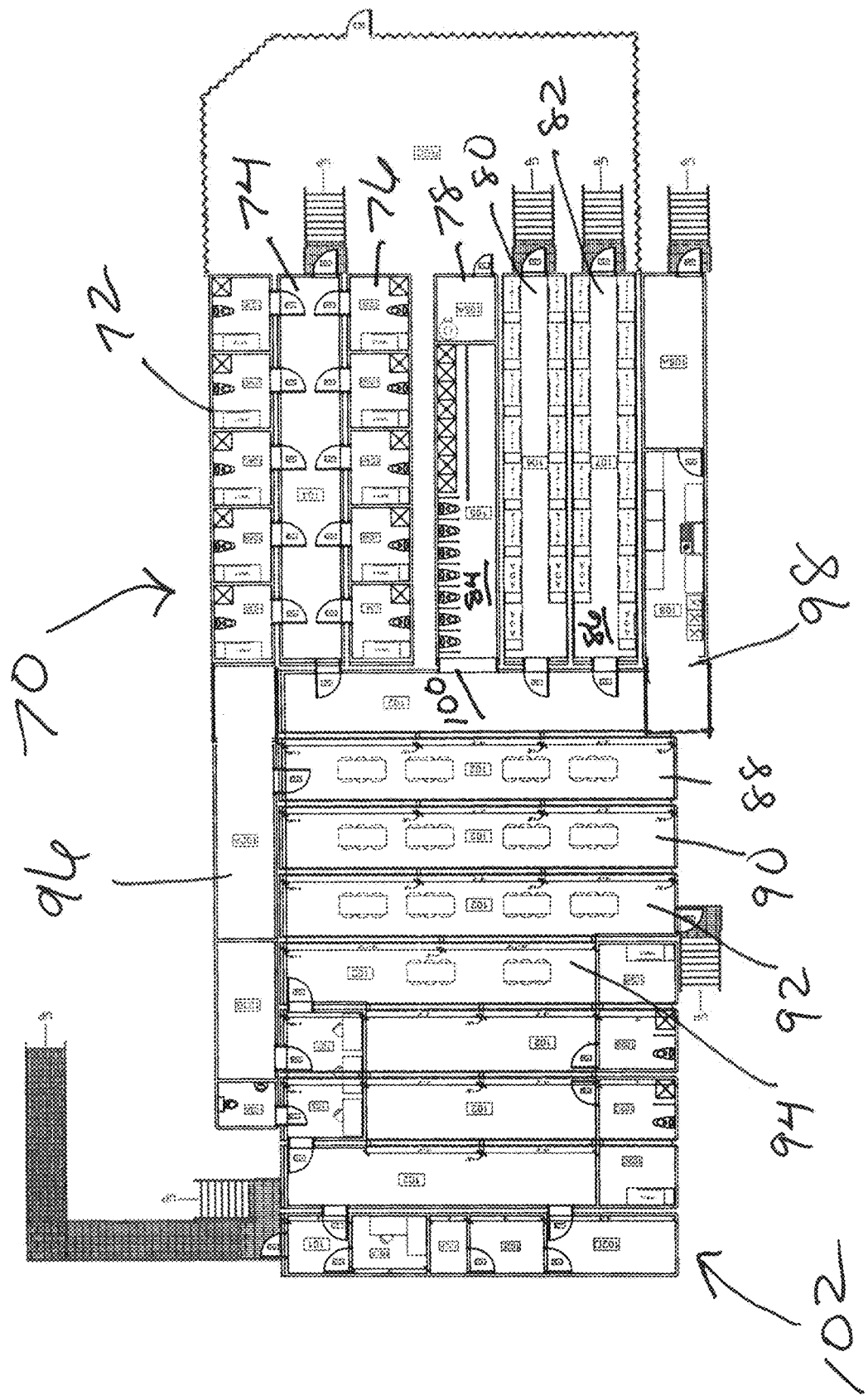
FIG. 8 is a top plan view of a series of semi-trailer units joined together according to the invention.

The invention permits the design of a myriad of features and functions for a temporary detention facility. As shown in FIG. 8, by arranging the orientation of connected trailer units, different detainment and housing facilities can be created. Furthermore, by selectively configuring openings and passageways in the walls of the joined trailer units, different size spaces can be easily created ranging from large open areas such as dining halls to small confined areas such as detainment cells. The design and configuration of the openings and passageways can facilitate on the one hand, and limit on the other hand, the movement through areas which must be controlled in a detainment situation.

In creating the detention center of the present invention, the semi-trailers provide a building block unit that permits a wide variety of configurations to support an overcrowded prison facility. Because of its scalability and mobility, the detention center created from the semi-trailer units provides significant auxiliary support to an existing prison facility or even as a stand-alone facility.

Figure 4:
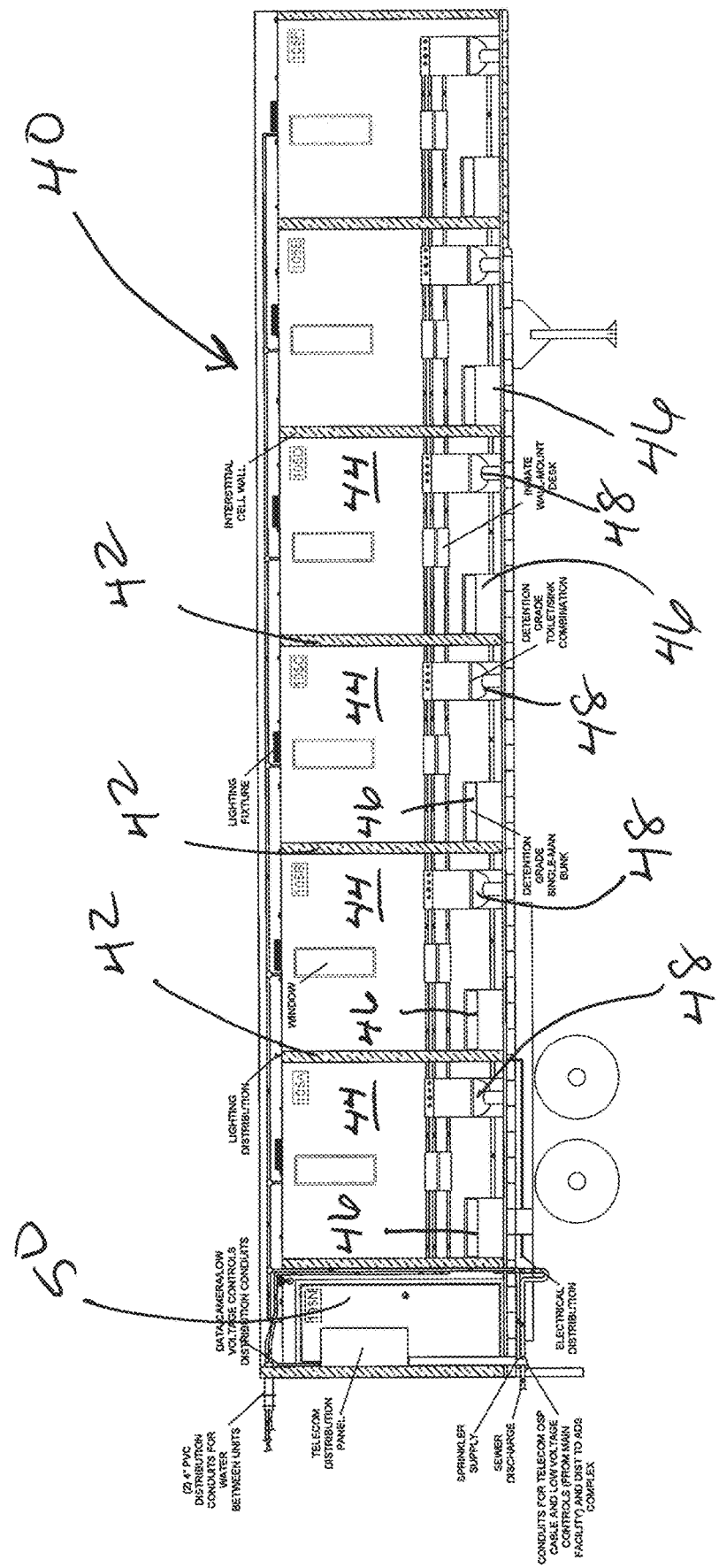
FIG. 4 is a cross-sectional view in side elevation of a semi-trailer unit modified according to the invention.

At its most basic, a single semi-trailer unit can be configured to provide multiple cells to accommodate prisoners. FIG. 4 shows a trailer unit 40 in cross-section. Partitions 42 are erected within unit 40 to serve as walls between individual cells 44. Each cell 44 can be provided with a bunk 46 and toilet 48. A control/utilities room 50 can be built into the end of trailer unit 40 which can accommodate electrical, plumbing and other resources relating to the cells.

Figure 3:
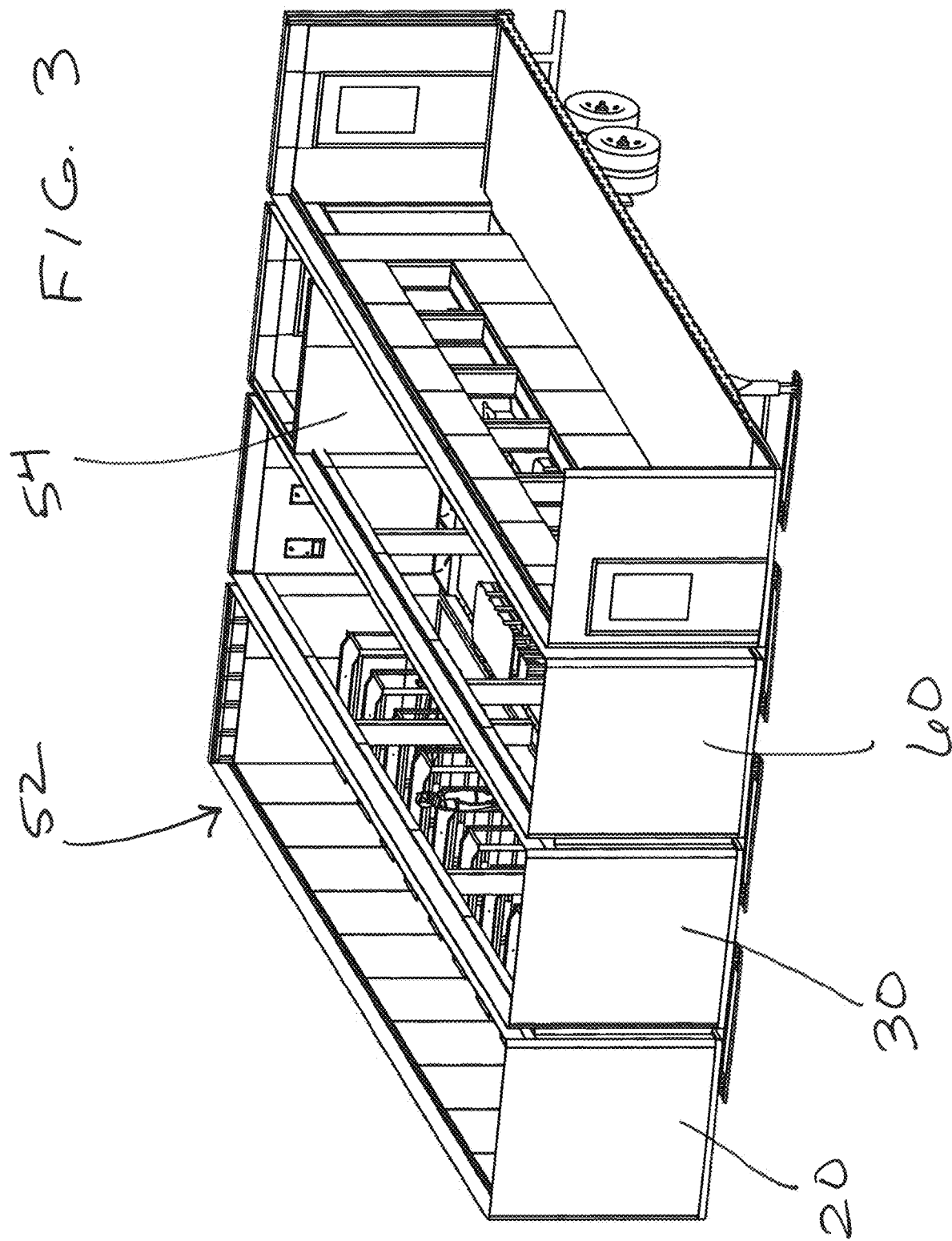
FIG. 3 is a perspective view of a series of semi-trailer units joined together according to the invention.

Trailer units are joined together by three different connecting configurations. In a first configuration, trailer units are joined side-by-side using connector plates described above and shown in FIG. 2. This type of connection facilitates creating an expansion to the detention complex as shown in FIG. 3 to construct cell areas 52 and a common area 54. In a second configuration shown in FIG. 6, trailer units are joined by attaching an intersecting trailer unit 56 to a lengthwise unit 58 in a perpendicular orientation. In a third configuration, trailer units are joined end-to-end.

Figure 9:
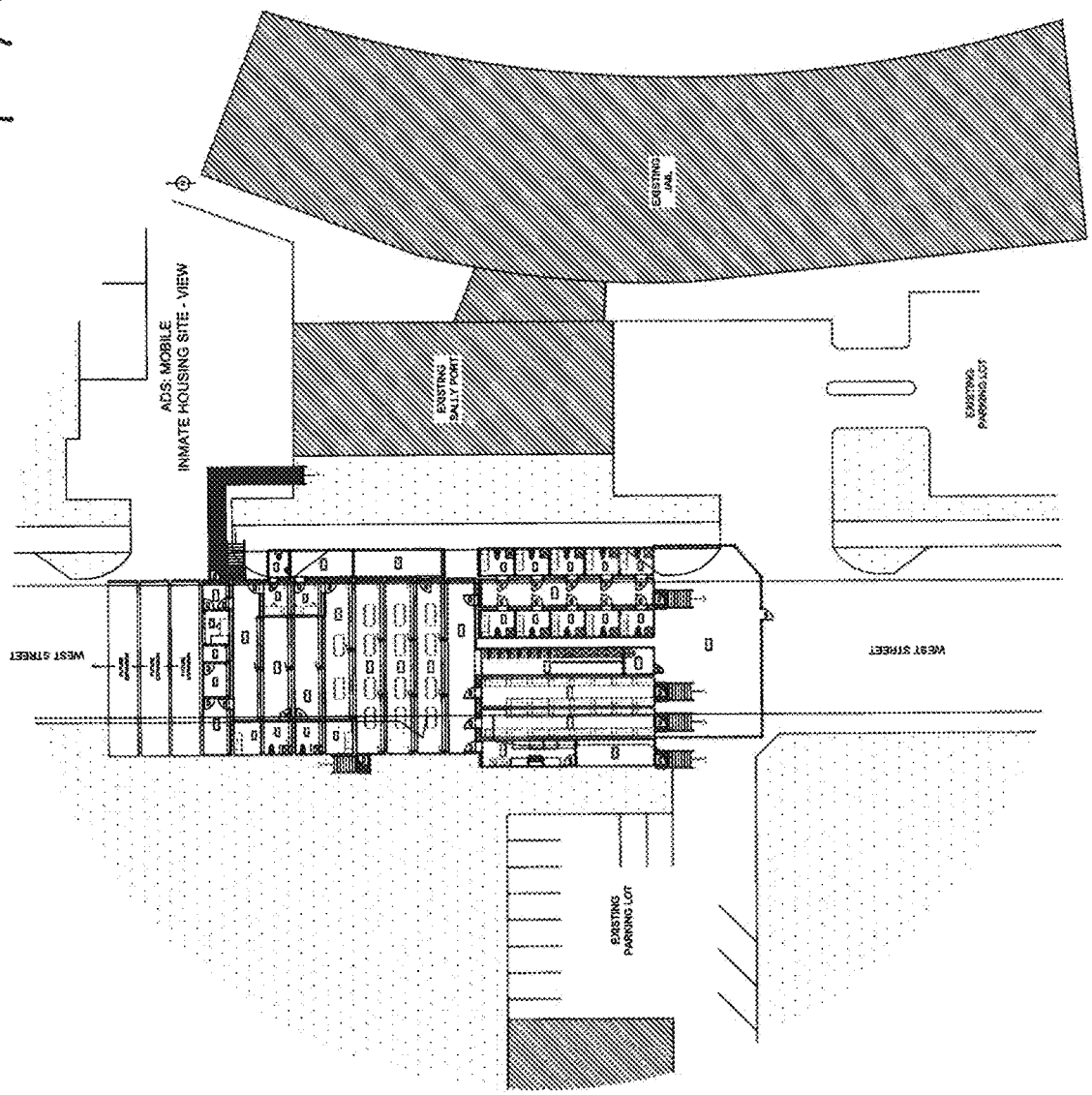
FIG. 9 is a top plan view of a series of semi-trailer units joined together according to the invention.

The various configurations for joining trailer units enable a wide degree of flexibility in how the detention complex can be constructed. This is a significant advantage that permits the layout of the complex over a space footprint that may not offer a simple plot area. That is, the available space for erecting the detention complex might not lie in one centralized square block, but rather might lie in small contiguous lots such as shown in FIG. 9, where the detention complex might only be able to be placed in a limited space on existing prison grounds. As an example, the available space for constructing the detention complex might only comprise two plots that are separated by some distance. To provide for a contiguous complex, a first assembly of units might be constructed on the first plot and a second assembly of units might be constructed on the second plot, and a series of trailer units connected end-to-end by the third configuration of joined units can comprise a passageway between the first and second assemblies and be connected to them by the second configuration of joined units so that the entire complex is interconnected.

Figure 6:
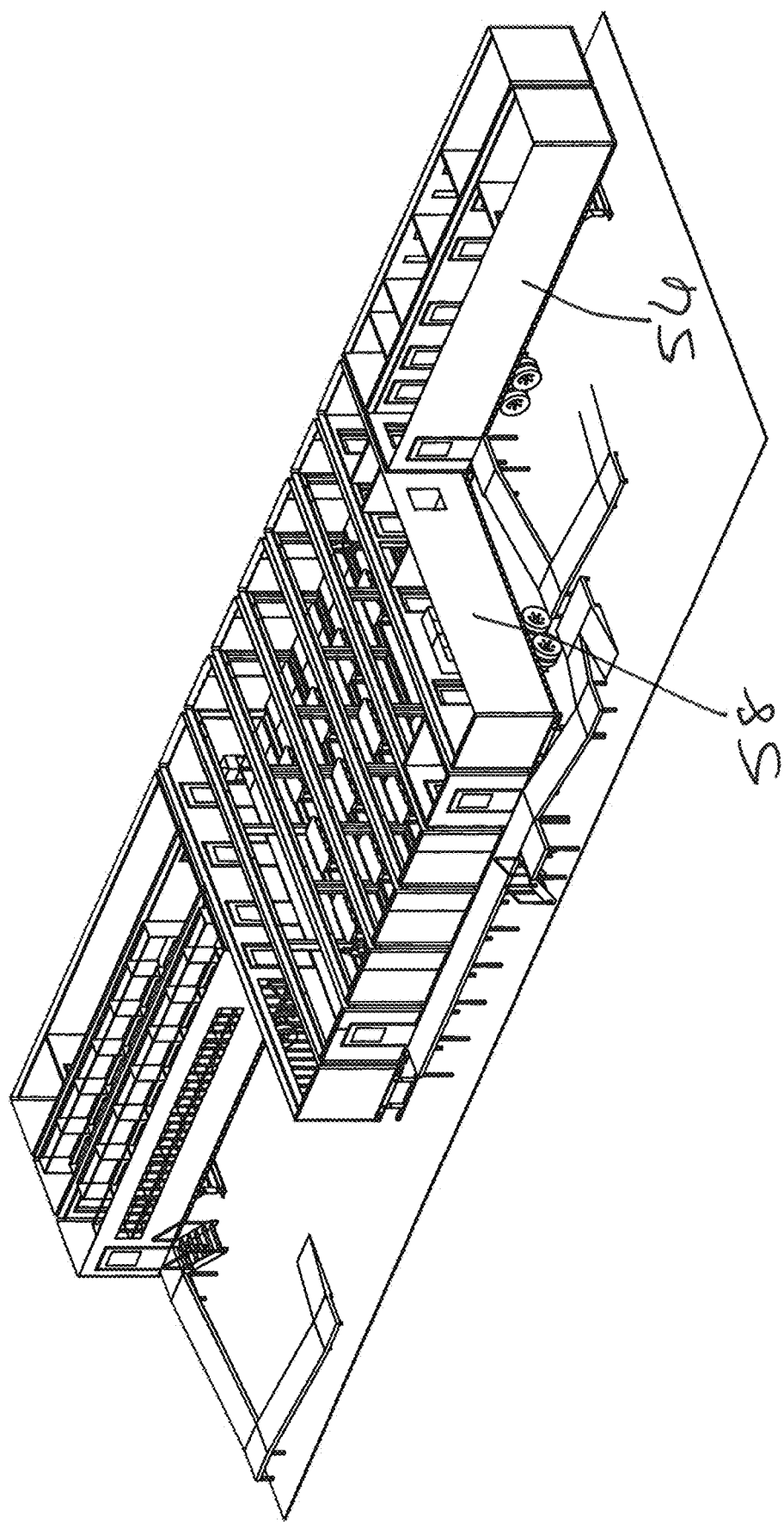
FIG. 6 is a perspective view of a series of semi-trailer units joined together according to the invention.

The first configuration of joined trailer units permits the creation of a common area. In this configuration, trailer units are joined side-by-side as shown in FIG. 3. The walls between trailer units 30 and 60 are removed to create an open passage between those units. In this fashion, a larger open area is created. Where desired, an even larger open area can be created by removing the walls between multiple adjacent trailer units as shown in FIG. 6. Common areas such as dining halls or entertainment areas can thereby be created.

Through a combination of connections using the first, second and third configurations for joining trailer units, a fully functional detention complex 70 can be created as shown in FIG. 8. Trailer units 72, 74 and 76 are joined together in side-by-side arrangement. Units 72 and 76 are configured for cells and unit 74 serves as the gangway between the cell rows of units 72 and 76. Units 78, 80 and 82 are joined together in side-by-side arrangement and serve as a shower/bathroom facility 84 and telephone communication center 86. Units 88, 90, 92 and 94 are joined together in side-by-side arrangement and serve as a dining facility. Unit 96 is connected to units 88, 90, 92 and 94, respectively, through the second configuration of joined units and is also connected to unit 72 through the third configuration of joined units. Similarly, unit 98 is connected to unit 82 through the first configuration of joined units. Units 96 (at an upper end), 74, 76, 78, 80, 82 (at a right end), 98 (at a lower end), and unit 88 (at a left end) form the perimeter of an open air exercise area 100. Appropriate doors and gates may be placed to permit passage through to necessary areas. Administrative areas can be created by joining additional units at 102.

Figure 5:
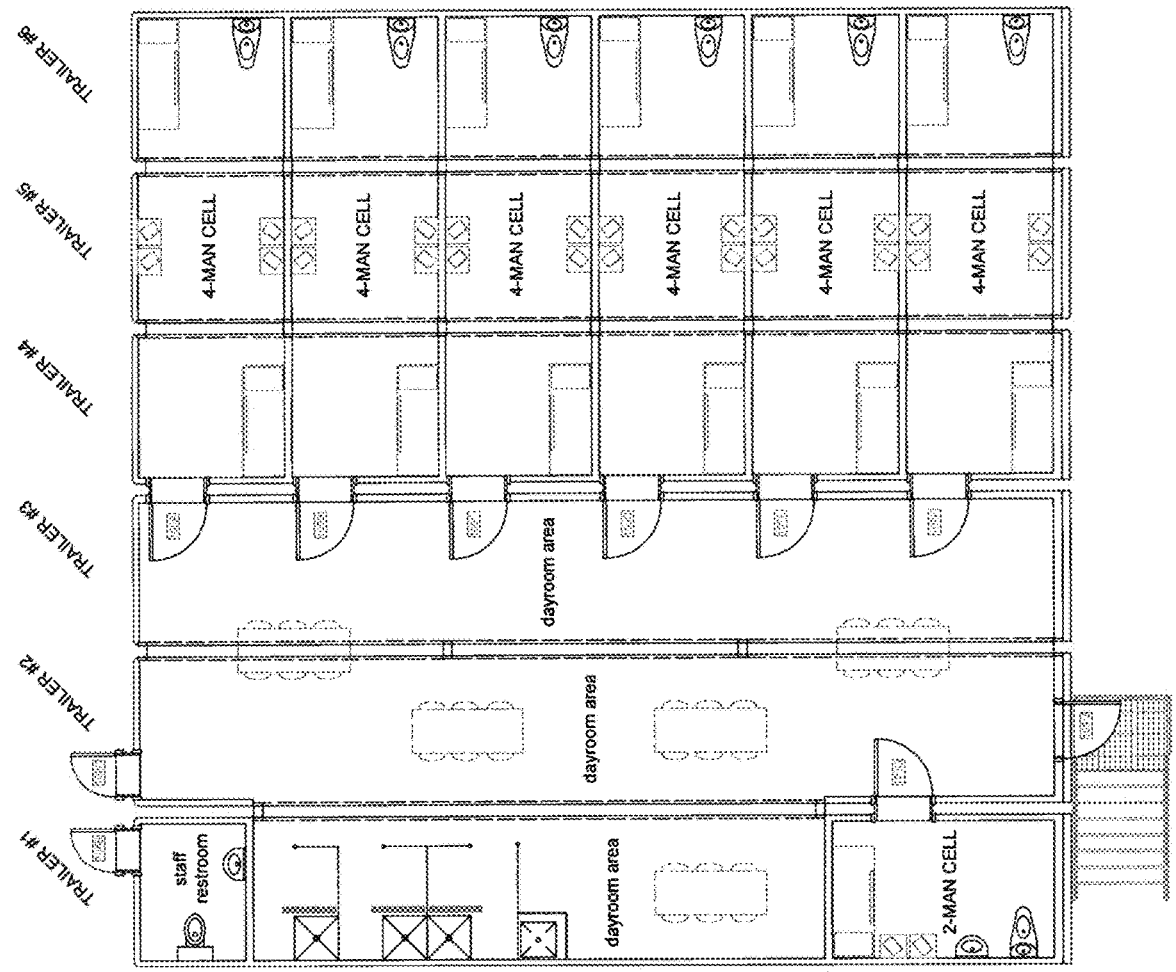
FIG. 5 is a top plan view of a series of semi-trailer units joined together according to the invention.
Figure 7:
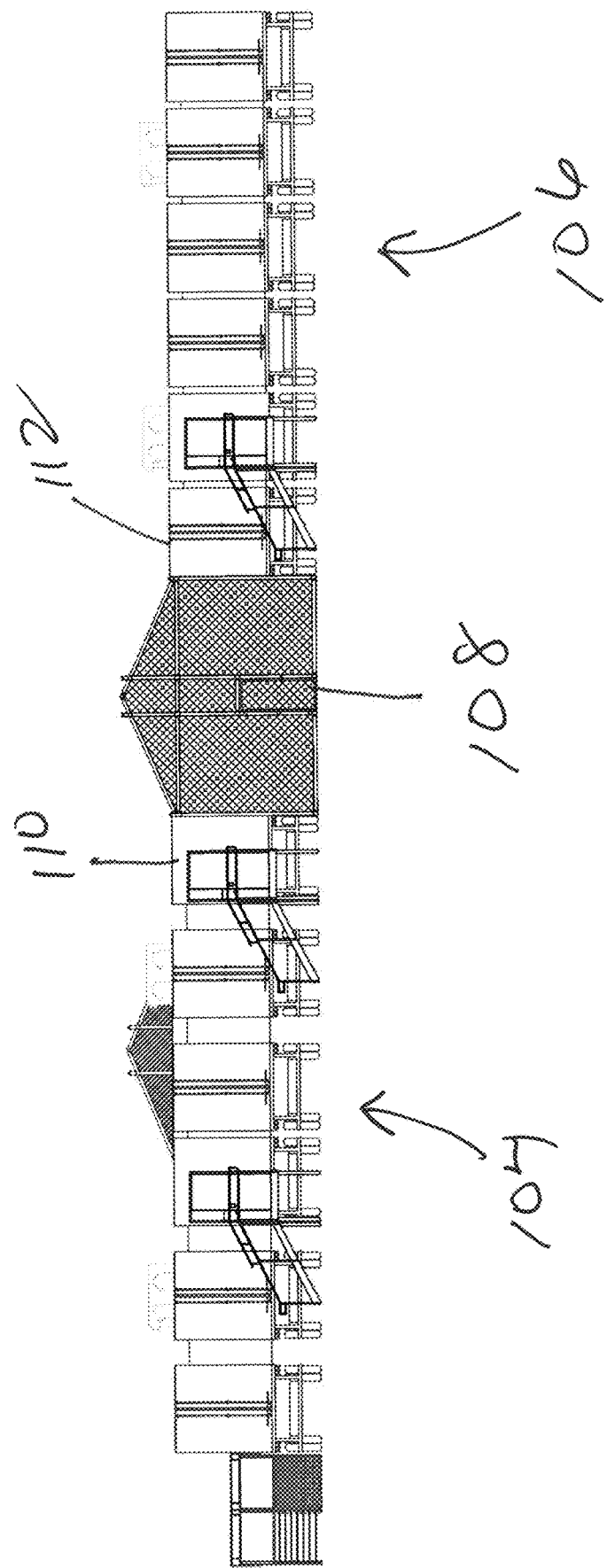
FIG. 7 is a view in side elevation of a series of semi-trailer units joined together according to the invention.

FIG. 5 shows a combination of trailer units joined together side-by-side by the first configuration of joined units to create a combination cell area and dayroom. FIG. 7 shows a first assembly of units 104 placed in adjacent proximity to a second assembly of units 106. Unit assembly 104 is spaced a distance apart from unit assembly 106. Security fencing 108 may be erected between the end walls of units 110 and 112 and similar security fencing may be placed at the other end of units 110 and 112 to create an enclosure that can serve as an exercise yard between assembly 104 and assembly 106.

Although the invention has been disclosed with reference to various particular embodiments, it is understood that equivalents may be employed and substitutions made herein without departing from the scope of the invention.

The invention claimed is:

1. A detention center comprising a plurality of semi-trailer units joined together, a first configuration of joined units being aligned and connected directly together side-by-side, connecting walls of at least one adjacent pair of adjoined units being removed, whereby an open passage is formed between the at least one adjacent pair of units, whereby a common contiguous area is created within the at least one adjacent pair of units, an assembly of units comprising the first configuration forming a detention complex comprising prison infrastructure, a plurality of units being configured with an entrance passage to permit entry into the detention complex.

2. The detention center of claim 1 in which a second configuration of joined units comprises an intersecting unit aligned perpendicularly with respect to a lengthwise unit, connecting walls between the second configuration of joined units being removed, whereby an open passage between the intersecting unit and the lengthwise unit is created.

3. The detention center of claim 2 in which the second configuration provides a connecting passageway between a first assembly of joined units and a second assembly of joined units.

4. The detention center of claim 1 in which a third configuration of joined units comprises adjacent units aligned and connected end-to-end.

5. The detention center of claim 4 in which connecting walls of at least one adjacent pair of units of the third configuration are removed, whereby an open passage between the at least one adjacent pair of units in the third configuration is created.

6. A method for creating a detention center by joining together a plurality of semi-trailer units, creating a first configuration comprising joining units that are aligned and connected directly together side-by-side, connecting walls of at least one adjacent pair of adjoined units being removed, whereby an open passage is formed between the at least one adjacent pair of units, whereby a common contiguous area is created within the at least one adjacent pair of units, and assembling together units comprising the first configuration to form a detention complex comprising a prison infrastructure, and providing a plurality of units with an entrance to permit entry into the detention complex.

7. The method of claim 6 in which a second configuration of joined units is created comprising aligning an intersecting unit perpendicularly with respect to a lengthwise unit, and removing connecting walls between the second configuration of joined units to create an open passage between the intersecting unit and the lengthwise unit.

8. The method of claim 7 in which a connecting passageway is provided between a first assembly of joined units and a second assembly of joined units by providing a unit for connection to an outward unit of each of the first and second assembly of joined units through the second configuration.

9. The method of claim 6 in which a third configuration of joined units is created by joining units that are aligned and connected end-to-end.

10. The method of claim 9 in which connecting walls of at least one adjacent pair of units in the third configuration are removed to create an open passage between the at least one adjacent pair of units in the third configuration.

11. The method of claim 6 in which a configuration of the detention complex is adjusted by varying a number of units joined together by the first configuration and varying a number of units joined together by the second configuration.

12. The method of claim 7 in which an enclosure yard is created by providing a first connecting passageway between a first assembly of joined units and a second assembly of joined units and placing a second connecting passageway between the first assembly of joined units and the second assembly of joined units at a distance from the first connecting passageway, whereby boundaries of the enclosure yard are formed by the first and second connecting passageways and the first and second assemblies of joined units.

13. The method of claim 6 in which the detention complex is provided with sleeping facilities.

14. The method of claim 6 in which the detention complex is provided with dining facilities.

15. The method of claim 6 in which the detention complex is configured with a plurality of passageways between adjacent units in the first and second configurations to promote movement between the joined units.

16. The method of claim 6 in which selected connecting walls of adjacent units are maintained in place within the detention complex to restrict movement between the joined units.

* * * * *